United States Patent
Cunico et al.

(10) Patent No.: US 10,268,897 B2
(45) Date of Patent: Apr. 23, 2019

(54) DETERMINING MOST REPRESENTATIVE STILL IMAGE OF A VIDEO FOR SPECIFIC USER

(71) Applicant: International Business Machines Corporation, Armonk, NY (US)

(72) Inventors: Hernan A. Cunico, Holly Springs, NC (US); Jonathan Dunne, Dungarvan (IE); Jeremiah O'Connor, Roscommon Town (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/469,458

(22) Filed: Mar. 24, 2017

(65) Prior Publication Data

US 2018/0276478 A1    Sep. 27, 2018

(51) Int. Cl.
*G06K 9/00* (2006.01)
*H04L 29/08* (2006.01)

(52) U.S. Cl.
CPC .......... *G06K 9/00751* (2013.01); *H04L 67/22* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,725,858 B1 | 5/2014 | Wu et al. | |
| 9,020,244 B2 | 4/2015 | Zwol et al. | |
| 9,367,756 B2 | 6/2016 | Pillai et al. | |
| 2005/0180730 A1 | 8/2005 | Huh et al. | |
| 2006/0227997 A1* | 10/2006 | Au | G06K 9/00771 382/103 |
| 2014/0328570 A1 | 11/2014 | Cheng et al. | |
| 2015/0220543 A1 | 8/2015 | Chechik et al. | |
| 2016/0004500 A1 | 1/2016 | Abuelsaad et al. | |
| 2016/0007058 A1 | 1/2016 | Wang et al. | |

(Continued)

OTHER PUBLICATIONS

"Microsoft Cognitive Service—Documentation"; retrieved from https://www.microsfot.com/cognitive-services/en-us/video-api/documentation/home on Dec. 29, 2016.

(Continued)

*Primary Examiner* — Stephen P Coleman
(74) *Attorney, Agent, or Firm* — North Shore Patents, P.C.; Michele Liu Baillie

(57) ABSTRACT

In determining a representative still image of a video, a first set of parameters for each frame in a video is derived, and a second set of parameters for a specific user is derived. A frame with first set of parameters that best matches the second set of parameters is identified and selected as the representative still image of the video for the specific user. Different parameters may be derived for different specific users, and different frames are identified as best matches for different specific users. Different parameters may be derived for the specific user at different times, and different frames are identified as best matching at the different times. Different values for the parameters for the same specific user may be calculated at different times, and different frames may be identified as best matching the parameters at the different time.

15 Claims, 6 Drawing Sheets

(56) References Cited

U.S. PATENT DOCUMENTS

2016/0042281 A1 2/2016 Cunico et al.
2016/0070962 A1 3/2016 Shetty et al.
2016/0188997 A1 6/2016 Desnoyer et al.

OTHER PUBLICATIONS

Ejaz, N., Mehmood, I., & Baik, S. W., "Efficient visual attention based framework for extracting key frames from videos", Signal Processing: Image Communication 28, Oct. 2012.
Hong, R., Tang, J., Tan, H. K., Ngo, C. W., Yan, S., & Chua, T. S., "Beyond Search: Event-Driven Summarization for Web Videos", ACM Transactions on Multimedia Computing, Communications, and Applications, vol. 2, No. 3; Aug. 2006.
Sun, X., Kankanhalli, M. S., Zhu, Y., & Wu, J., "Content-based representative frame extraction for digital video", Multimedia Computing and Systems, Proceedings, IEEE International Conference, pp. 190-193, Jun. 1998.
Truong, B. T., & Venkatesh, S., "Video abstraction: A systematic review and classification", ACM Transactions on Multimedia Computing, Communications, and Applications 3, 1, Article 3, Feb. 2007.
Wikipedia, "Computer vision"; retrieved from https://en.wikipedia.org/wiki/Computer_vision on Dec. 29, 2016.
Yang, Y., Cui, P., Zhu, W., Zhao, H. V., Shi, Y., & Yang, S. "Emotionally representative image discovery for social events. In Proceedings of International Conference on Multimedia Retrieval", ACM, p. 177, Apr. 2014.

* cited by examiner

| Time Index | Frame | Recognition. Tag1 | Recognition. Tag2 | Emotion. Anger | Emotion. Disgust | Emotion. Fear | Emotion. Joy | Emotion. Sadness |
|---|---|---|---|---|---|---|---|---|
| 00:00:01 | 1 | Woman | Speaking | 0.19 | 0.08 | 0.21 | 0.48 | 0.48 |
| 00:00:02 | 31 | Woman | Speaking | 0.17 | 0.14 | 0.05 | 0.81 | 0.05 |
| 00:00:03 | 62 | Woman | Speaking | 0.27 | 0.18 | 0.31 | 0.58 | 0.58 |
| 00:00:11 | 93 | Woman | Speaking | 0.37 | 0.24 | 0.15 | 0.91 | 0.15 |

FIG. 4

| Update # | Date Posted | Stream Element | Content author | Stream Content | Summarization Trigger |
|---|---|---|---|---|---|
| 1 | June 30th | Response to File Upload | User1 | Would like to use Person X process to review in terms of making this a standard (should be fairly easy) and then I hope the work that is done to automate and deploy can be leveraged by anyone else who want to use the product | I'd like to see text like : Review product for use as part of a standard in our cognitive platform |
| 2 | Sept 2nd | File Upload | User2 | User2 updated this file and lost all her changes | I want to know when User2 uploads a file but want increased notification when the keywords like file loss are mentioned |
| 3 | August 31st | Video Blog | User3 | Video blog of best agile methods and practices. | I like to see enthusiastic people being interviewed who exude positive energy. |

FIG. 5

DETERMINING MOST REPRESENTATIVE STILL IMAGE OF A VIDEO FOR SPECIFIC USER

BACKGROUND

Videos are a very popular way to complement a message in a blog or even replace some type of articles entirely. Some video players allow the selection of a frame in the video to be used as a static image representation of the video. Some other video players automatically pick a frame at random. The problem with these approaches is that the selection of the frame as the representative still image must be a manual step, or if automated, the selected frame may not be the most appropriate frame in the video picked.

SUMMARY

Disclosed herein is a method for determining a representative still image of a video for a specific user and a computer program product as specified in the independent claims. Embodiments of the present invention are given in the dependent claims. Embodiments of the present invention can be freely combined with each other if they are not mutually exclusive.

According to an embodiment of the present invention, a method for determining a representative still image of a video for a specific user includes: using semantic and sentiment analysis, deriving, by a server, a first set of parameters for each frame in a video; using cognitive analysis of collaboration and social media information of a specific user, deriving, by the server, a second set of parameters; identifying, by the server, a frame in the video that has the first set of parameters best matching the second set of parameters associated with the specific user; and displaying, by the server, the frame as the representative still image of the video for the specific user.

In one aspect of the present invention, a different second set of parameters is derived by the server for a second specific user, and a different frame in the video is identified that has the first set of parameters best matching the different second set of parameters associated with the second specific user.

In another aspect of the present invention, a different second set of parameters is additionally derived by the server for the specific user at a different time, and a different frame in the video is identified that has the first set of parameters best matching the different second set of parameters associated with the specific user at the different time.

In another aspect of the present invention, different values for the second set of parameters associated with the specific user is calculated by the server at a different time, and a different frame in the video is identified that has the first set of parameters best matching the second set of parameters associated with the specific user at the different time.

BRIEF DESCRIPTION OF THE DRAWINGS

FIG. 4 illustrates example parameters for a video, derived by the cognitive analysis module of the present invention.

FIG. 5 illustrates example data for specific users, which can be collected from various collaboration and social media platforms and which the cognitive analysis module may use to derive the second set of parameters for each specific user.

DETAILED DESCRIPTION

A frame in a video can be selected and displayed as a representative still image of the video, such as when a video is made available for playing on a website or social media platform. Embodiments of the present invention select a representative still image that is personalized for a specific user. In determining a representative still image of the video, embodiments of the present invention derive a first set of parameters for the video that captures characteristics of each frame in the video, and derives a second set of parameters for the specific user that captures characteristics of the specific user. The first and second sets of parameters are configured such that they capture comparable characteristics. A frame with first set of parameters that best matches the second set of parameters is identified and selected as the representative still image of the video for the specific user. The selected frame can then be displayed to the specific user as the still image representing the video. The second set of parameters may be dynamically derived, where the particular parameters in the second set of parameters may vary for different specific users and/or for the same specific user at different times. Different frame of the same video can be identified as best matches for different specific users or for the same specific user at different times. In this manner, the user experience when presented with a video available for playing can be personalized.

Figure 1:
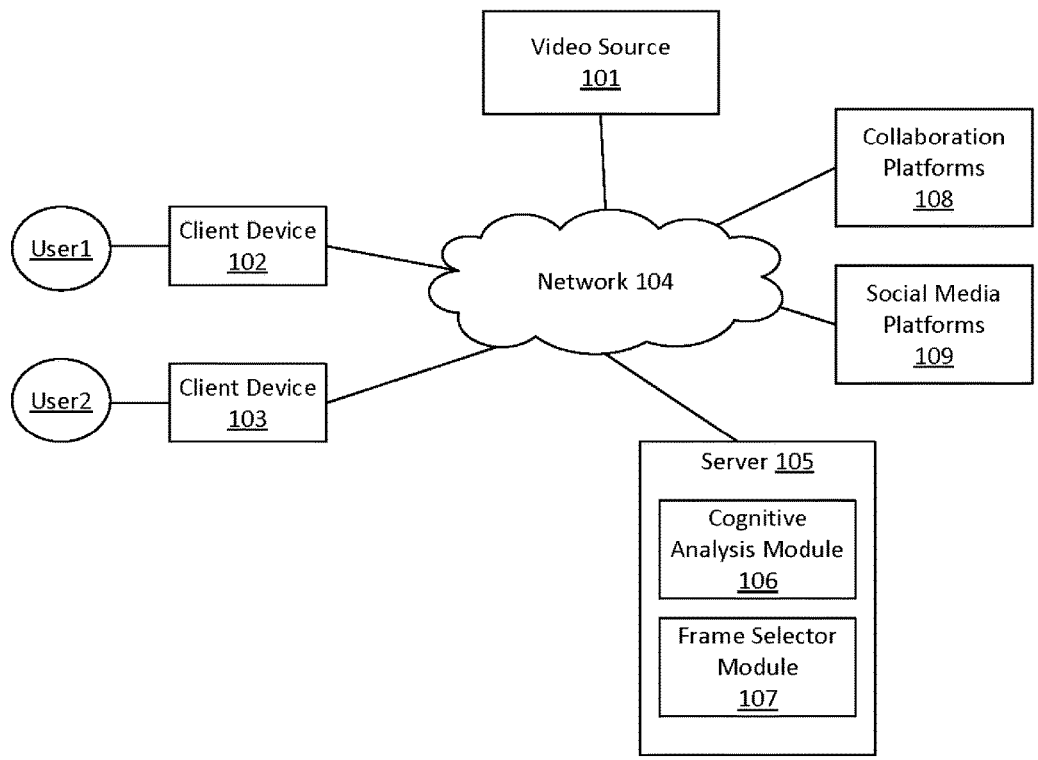
FIG. 1 illustrates an exemplary embodiment of a system for determining a representative still image of a video for a specific user, according to the present invention.

FIG. 1 illustrates an exemplary embodiment of a system for determining a representative still image of a video for a specific user, according to the present invention. The system includes a plurality of client devices 102-103, used by a plurality of users (User1 and User2). The client devices 102-103 are configured to receive or be offered access to videos from a video source 101 over a network 104, such as by a website through a browser on the client devices 102-103. The system further includes a server 105 configured with access to the videos from the video source 101. For example, the server 105 may be configured with access to a central media library (not shown) storing videos that can be played by video players embedded in various websites. For further example, the server 105 may be configured with access to social media channels and other ad-hoc applications that support embedded video. The server 105 is further configured to receive a notification that a client device 102 is to receive or be offered access to a video from the video source 101 via an agent at a client device or via instructions embedded in a website. The server 105 is further configured with a cognitive analysis module 106 and a frame selector module 107. The cognitive analysis module 106 is configured to perform cognitive analyses on the video and on user information relevant to User1 and User2. The frame selector module 107 is configured to select a frame of the video as a representative still image of the video based on the cognitive analyses and to cause the display of the representative still image of the video at the client device 102. The server 105 may receive user information from a variety of sources, such as collaboration platforms 108 and social media platforms 109. In an exemplary embodiment, the server 105 is a computer system 600, described below with reference to FIG. 6, with the cognitive analysis module 106 and the frame selector module 107 implemented by program code 605 executed by a processor 606. The functionalities of the cognitive analysis module 106 and the frame selector module 107 are described further below.

Figure 2:
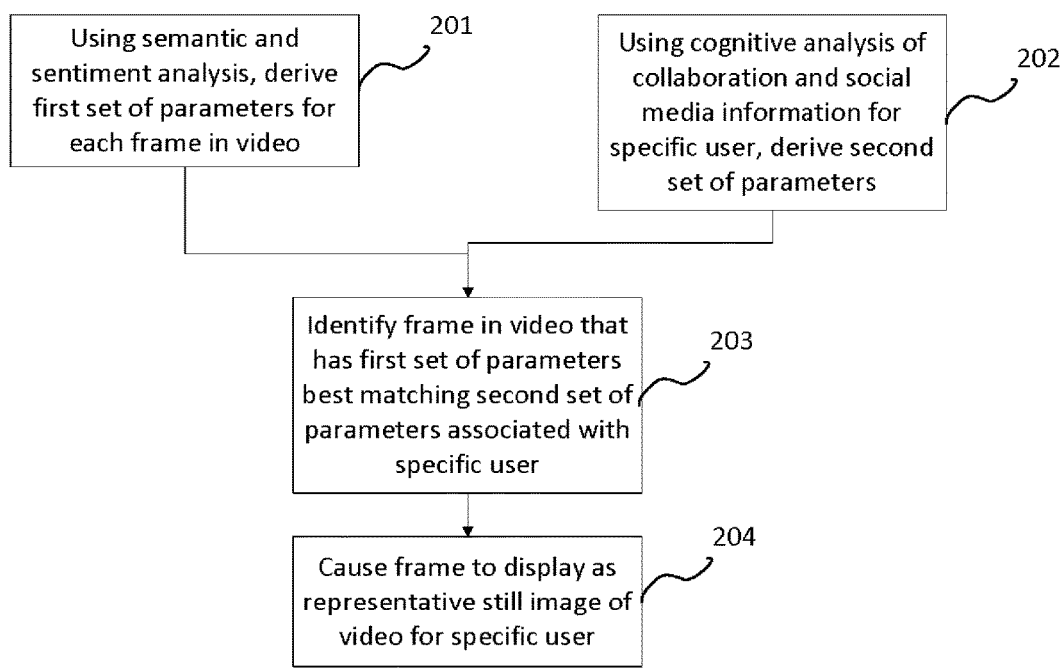
FIG. 2 illustrates an exemplary embodiment of a method for determining a representative still image of a video for a specific user, according to the present invention.

FIG. 2 illustrates an exemplary embodiment of a method for determining a representative still image of a video for a specific user, according to the present invention. In response to the server 105 receiving a notification that one of the client devices 102 is to receive or be offered access to a video from the video source 101, the server 105 obtains a copy of the video. The cognitive analysis module 106 derives a first set of parameters for each frame in the video, using semantic and sentiment analysis (201). The cognitive analysis module 106 further derives a second set of parameters, using cognitive analysis of collaboration and social media information for the specific user (User1) at the client device 102 (202). The first set of parameters capture characteristics of each frame in the video, and the second set of parameters capture characteristics of the specific user. The first and second sets of parameters are configured to capture comparable characteristics. Example parameters in the first set of parameters may include, but are not limited to: identity of a speaker; type of conversation; topic; and tone (e.g. anger, disgust, fear, joy, sadness). Example parameters in the second set of parameters may include, but are not limited to: identity of specific user; topics of interest; subscriptions (to social media platforms, websites, etc.); mood (e.g. anger, disgust, fear, joy, sadness) The derivation of the first set of parameters may occur concurrently or serially with the derivation of the second set of parameters. Optionally, the derivation of the first and second sets of parameters may occur independently of each other. For example, the first set of parameters may be derived before a specific user goes to a social media platform or website that offers access to a video, and the first set of parameters may be stored in a repository (not shown) accessible to the server 105. Optionally, the first set of parameters can be stored as part of the metadata of the corresponding video. For another example, the first and second sets of parameters may be derived concurrently or serially in response to the receipt of the notification by the server 105. For another example, the first set of parameters for the video may be derived when a notification is received by the server 105, while the second set of parameters for the specific user may be derived independently, such as at predetermined intervals, and vice versa. The frame selector module 107 then identifies the frame in the video that has the first set of parameters that best matches the second set of parameters associated with the specific user (203). The frame selector module 107 causes the display of the selected frame as the representative still image of the video for the specific user (User1) (204). For example, the frame selector module 107 may cause the display of the selected frame via an application programming interface (API) of a video viewer or player embedded in a webpage.

Figure 3:
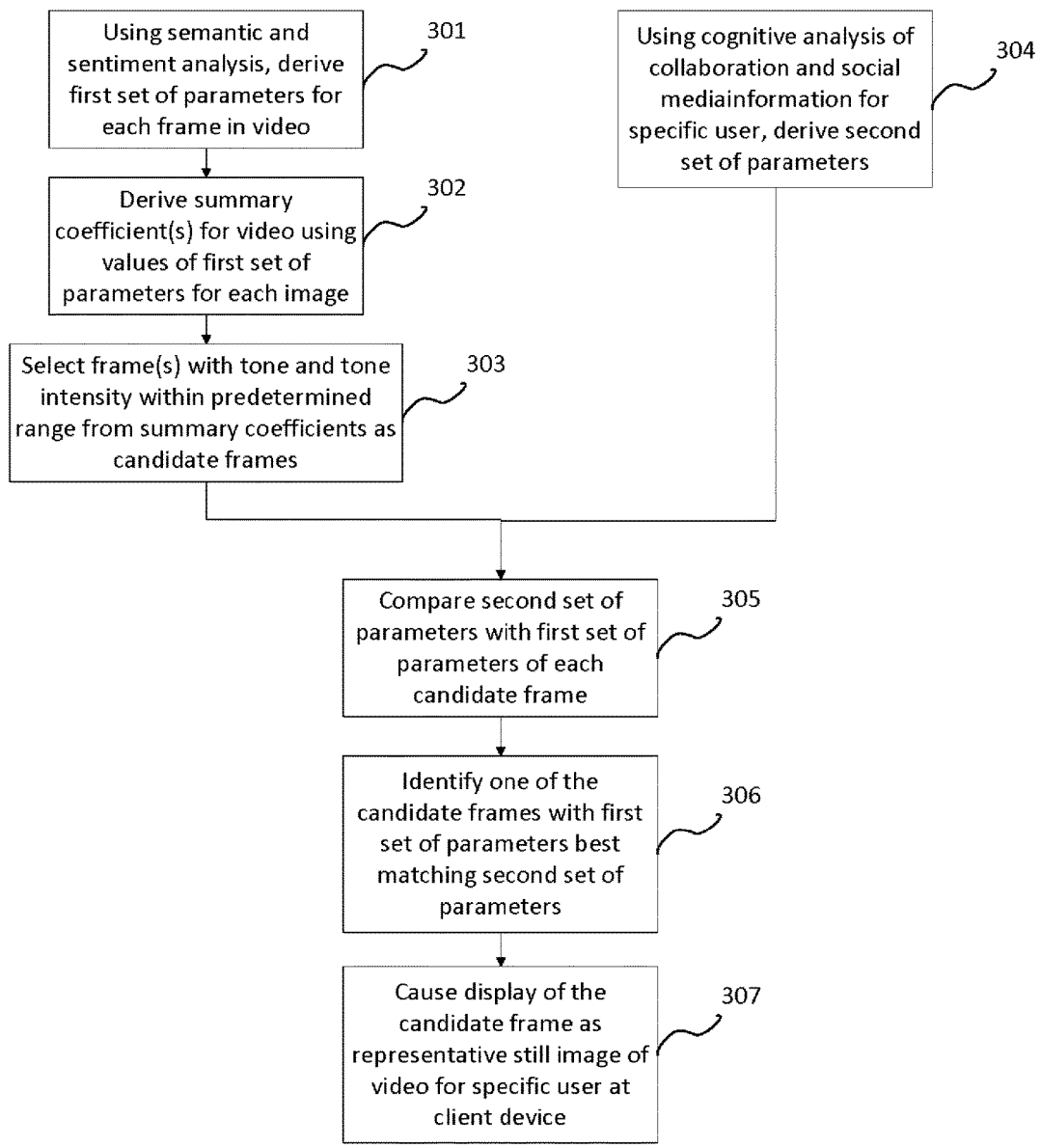
FIG. 3 illustrates in more detail the exemplary embodiment of the method for determining a representative still image of a video for a specific user, according to the present invention.

FIG. 3 illustrates in more detail the exemplary embodiment of the method for determining a representative still image of a video for a specific user, according to the present invention. Prior to or in response to the server 105 receiving a notification that one of the client devices 102 is to receive or be offered access to a video from the video source 101, the server 105 obtains a copy of the video. The cognitive analysis module 106 derives a first set of parameters for each frame in the video, using semantic and sentiment analysis (301). Known semantic and sentiment analysis techniques may be used to assess the content and tone of the video, such as natural language processing and facial and body language analytics. FIG. 4 illustrates example parameters for a video, derived by the cognitive analysis module 106 of the present invention and indexed by time and frame number. Assume in this example that the video shows a female speaker. Using semantic and sentiment analysis, the identity of the person in each frame (Recognition.Tag1) and what the person in the frame is doing (Recognition.Tag2), and their values ('Woman' and 'Speaking') are derived. The tone of each frame is captured collectively in the parameters representing the five main emotions (Emotion.Anger; Emotion.Disgust; Emotion.Fear; Emotion.Joy; Emotion.Sadness), with their respective values capturing the intensity of each emotion on a predetermined scale. The semantic analysis may further derive the topic(s) (not shown) discussed by the speaker through natural language processing to assess the content of the video. Through these analyses, the characteristics of the video's content and tone are captured in the first set of parameters, which can then be stored in a database. Returning to FIG. 3, after deriving the first set of parameters, the frame selector module 107 derives one or more summary coefficients for the video using the values of the first set of parameters relevant to the tone for each image of the video (302). A summary coefficient is a value which represent a summary of the tone and tone intensity for a frame, group or sequence of frames, or a segment of the video. By conducting the analysis of a multi-factor dataset, such as the first set of parameters for each of the plurality of frames in the video, a regression model can be derived, from which the summary coefficients can be calculated. The frame selector module 107 selects one or more frames of the video with tone and tone intensity within a predetermined range from the summary coefficients as candidate frames (303). By using the summary coefficients to select candidate frames, the comparison of the first set of parameters for the frames in the video and the second set of parameters for the specific user can be optimized. The comparison can be limited to the candidate frames instead of comparing parameters for each and every frame of the video. For a lengthy video, this optimization can result in significant resource savings.

Concurrently, serially, or independently of the derivation of the first set of parameters, the cognitive analysis module 106 also derives a second set of parameters for the specific user at the client device 102, using cognitive analysis of the collaboration and social media information for the specific user (304). FIG. 5 illustrates example data for specific users indexed by update number, which can be collected from various collaboration and social media platforms 108-109 and which the cognitive analysis module 106 may use to derive the second set of parameters for each specific user. The example data collected includes a date of a post on a platform, a stream element type ('Response to File Upload', 'File Upload', 'Video Blog'), the content author ('User1', 'User2', 'User3'), a stream content, and a summarization trigger. The stream content can include text of a response in the form of an email or post, demographic information about the author, author's areas of expertise gathered from profile data and other sources. The summarization trigger can include expressions of topics of interest. Known cognitive analysis techniques may be used, including the semantic and sentiment analyses used to derive the first set of parameters. The second set of parameters may be dynamically derived, where the parameter types in the second set may vary from user to user. For the same user, the parameter types may also vary each time the cognitive analysis in step 304 is performed. In this manner, changes in a specific user's environment, mood, and/or interests over time may be taken into account in the selection of the most representative image of the video.

The frame selector module 107 compares the second set of parameters for the specific user with the first set of parameters of each candidate frame selected in step 303 (305). For example, the parameter type and parameter values in the first and second sets of parameters may be compared. The comparison can be based on a direct comparison of the same parameters, based on a preconfigured mapping of parameters between the first and second sets, or based on a comparison of compatible or related parameters as defined by an ontology database. The frame selector module 107 identifies one of the candidate frames with the first set of parameters that best match the second set of parameters (306). Thresholds may be set to define the delta between parameter values that would be considered a match. Other definitions of a "match" may be configured based on the results desired. For example, parameters representing the mood of a specific user may be defined as a match to parameters representing an opposite tone for a frame in a video (e.g. 'sad' mood for specific user matched to 'happy' mood for the frame). When multiple parameters are matched, the parameters in the first and second sets may be weighted and scored to define priority, where the highest scoring match applies. The selected candidate frame is then caused to be displayed at the client device 102 as the representative still image of the video for the specific user (User1) (307). This process may be repeated for multiple users, where different sets of parameters may be derived for different users or at different times for the same user. Because different sets of parameters may be derived, different representative still images for the same video may be selected for different users and/or at different times for the same user. Optionally, the representative still image may be selected for a target audience that includes a plurality of users, where the second sets of parameters would be derived based on information pertaining to the plurality of users.

In one exemplary embodiment, the video is available "offline", i.e., the entire video is available for analysis by the server 105. For this exemplary embodiment, all of the frames in the video may be used in the analysis. In another exemplary embodiment, the video is available as a live stream. For this exemplary embodiment, analysis may be performed at preset intervals, where frames of the video received so far are analyzed. For a live video stream, the representative still image may change as more frames of the video are received.

In one example, assume that a social media post that includes a video is accessed by both User1 and User2 at their respective client devise 102-103. Assume that the first set of parameters capturing characteristics of the video includes a 'topic' parameter. For a first frame in the video, the 'topic' parameter value is 'cooking'. For a second frame in the video, the 'topic' parameter value is 'travel'. The second set of parameters for User1 and User2 is derived to include a 'topic of interest' parameter, and the value for User1 is 'food' while the value for User2 is 'getaways'. Here, the 'topic' and 'topic of interest' parameters are defined as being compatible. Also, 'cooking' is defined as a match to 'food', and 'travel' is defined as a match to 'getaways' using an ontology database. The first frame is thus selected as the representative still image of the video specifically for User1, while the second frame is selected as the representative still image of the video specifically for User2. In this manner, different frames of the video are selected as representative still images to personalize the experiences of User1 and User2.

In another example, assume that a social media post that includes a video is accessed by User1 at two different times of the day. Assume that the first set of parameters capturing characteristics of the video includes parameters that represent a tone of the frames in the video. For a first frame in the video, the parameters represent a tone of 'happy'. For a second frame in the video, the parameters represent a tone of 'neutral'. The second set of parameters for User1 is derived to include parameters representing a mood of User1, and the value for these parameters is determined to represent a 'happy' mood at 10 am and a 'sad' mood at 3 pm for User1. Here, the mood of 'happy' is defined to match a tone of 'happy', and mood of 'sad' is defined to match a tone of either 'neutral' or 'happy'. The first frame can be selected as the representative still image of the video specifically for User1 at 10 am (mood of 'happy' matched to tone of 'happy'). For User1 at 3 pm, either the first or the second frame can be selected as the representative still image of the video (mood of 'sad' matched to tone of 'happy' and 'neutral'). If the matching is configured to be weighted in favor of 'happy' in this situation, then the first frame is chosen. If the matching is configured to be weighted in favor of 'neutral' in this situation, then the second frame is chosen. In this manner, different frames of the video are selected as representative still images to personalize the experiences of User1 at different times.

Figure 6:
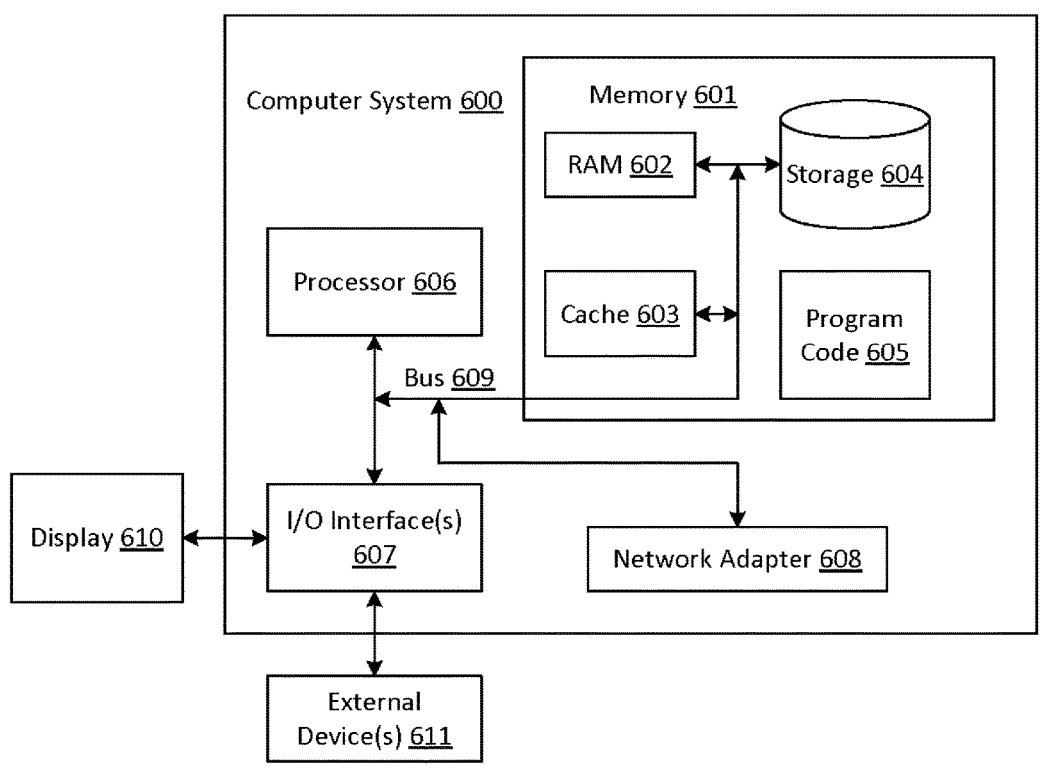
FIG. 6 illustrates a computer system for implementing the present invention, according to embodiments of the present invention.

FIG. 6 illustrates a computer system for implementing the present invention, according to embodiments of the present invention. The computer system 600 is operationally coupled to a processor or processing units 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or non-volatile storage media 604. The memory 601 may include at least one program product having a set of at least one program code module 605 that are configured to carry out the functions of embodiment of the present invention when executed by the processor 606. The computer system 600 may also communicate with one or more external devices 611, such as a display 610, via I/O interfaces 607. The computer system 600 may communicate with one or more networks via network adapter 608.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a representative still image of a video for a specific user, the video comprising a plurality of frames, comprising:
   using semantic and sentiment analysis, deriving, by a server, a first set of parameters for each frame in a video;
   using cognitive analysis of collaboration and social media information of the specific user, deriving, by the server, a second set of parameters;

identifying, by the server, a frame in the video that has the first set of parameters best matching the second set of parameters associated with the specific user;

causing, by the server, the frame to be displayed as the representative still image of the video for the specific user;

deriving, by the server, a third set of parameters different from the second set of parameters for a second specific user; and identifying, by the server, a different frame in the video that has the first set of parameters best matching the third set of parameters associated with the second specific user.

2. The method of claim 1, wherein a different second set of parameters is additionally derived by the server for the specific user at a different time, wherein a different frame in the video is identified that has the first set of parameters best matching the different second set of parameters associated with the specific user at the different time.

3. The method of claim 1, wherein different values for the second set of parameters associated with the specific user is calculated by the server at a different time, wherein a different frame in the video is identified that has the first set of parameters best matching the second set of parameters associated with the specific user at the different time.

4. The method of claim 1, wherein the deriving of the first set of parameters for each frame in the video further comprises:

deriving, by the server, one or more summary coefficients for the video using values of the first set of parameters for each frame in the video; and selecting one or more frames in the video with tone and tone intensity within a predetermined range of the one or more summary coefficients as candidate frames.

5. The method of claim 4, wherein the identifying of the frame in the video that has the first set of parameters best matching the second set of parameters associated with the specific user comprises:

comparing the second set of parameters with the first set of parameters of each candidate frame; and identifying one of the candidate frames with the first set of parameters best matching the second set of parameters.

6. A computer program product for determining a representative still image of a video for a specific user, the video comprising a plurality of frames, the computer program product comprising a computer readable storage medium having program instructions embodied therewith, the program instructions executable by a computer system to cause the computer system to:

using semantic and sentiment analysis, derive a first set of parameters for each frame in the video;

using cognitive analysis of collaboration and social media information of the specific user, derive a second set of parameters;

identify a frame in the video that has the first set of parameters best matching the second set of parameters associated with the specific user;

cause the frame to display as the representative still image of the video for the specific user;

derive a third set of parameters different from the second set of parameters for a second specific user; and identify a different frame in the video that has the first set of parameters best matching the third set of parameters associated with the second specific user.

7. The computer program product of claim 6, wherein a different second set of parameters is additionally derived for the specific user at a different time, wherein a different frame in the video is identified that has the first set of parameters best matching the different second set of parameters associated with the specific user at the different time.

8. The computer program product of claim 6, wherein different values for the second set of parameters associated with the specific user is calculated at a different time, wherein a different frame in the video is identified that has the first set of parameters best matching the second set of parameters associated with the specific user at the different time.

9. The computer program product of claim 6, wherein the deriving of the first set of parameters for each frame in the video further comprises:

derive one or more summary coefficients for the video using values of the first set of parameters for each frame in the video; and select one or more frames in the video with tone and tone intensity within a predetermined range of the one or more summary coefficients as candidate frames.

10. The computer program product of claim 9, wherein the identifying of the frame in the video that has the first set of parameters best matching the second set of parameters associated with the specific user comprises:

compare the second set of parameters with the first set of parameters of each candidate frame; and identify one of the candidate frames with the first set of parameters best matching the second set of parameters.

11. A system, comprising:

a processor; and a computer readable storage medium having program instructions embodied therewith, the program instructions executable by the processor to cause the processor to:

using semantic and sentiment analysis, derive a first set of parameters for each frame of a plurality of frames in a video;

using cognitive analysis of collaboration and social media information of a specific user, derive a second set of parameters;

identify a frame in the video that has the first set of parameters best matching the second set of parameters associated with the specific user;

cause the frame to display as a representative still image of the video for the specific user;

derive a third set of parameters different from the second set of parameters for a second specific user; and identify a different frame in the video that has the first set of parameters best matching the third set of parameters associated with the second specific user.

12. The system of claim 11, wherein a different second set of parameters is additionally derived for the specific user at a different time, wherein a different frame in the video is identified that has the first set of parameters best matching the different second set of parameters associated with the specific user at the different time.

13. The system of claim 11, wherein different values for the second set of parameters associated with the specific user is calculated at a different time, wherein a different frame in the video is identified that has the first set of parameters best matching the second set of parameters associated with the specific user at the different time.

14. The system of claim 11, wherein the deriving of the first set of parameters for each frame in the video further comprises:
- derive one or more summary coefficients for the video using values of the first set of parameters for each frame in the video; and
- select one or more frames in the video with tone and tone intensity within a predetermined range of the one or more summary coefficients as candidate frames.

15. The system of claim 14, wherein the identifying of the frame in the video that has the first set of parameters best matching the second set of parameters associated with the specific user comprises:
- compare the second set of parameters with the first set of parameters of each candidate frame; and
- identify one of the candidate frames with the first set of parameters best matching the second set of parameters.

\* \* \* \* \*